United States Patent [19]

Freedman et al.

[11] Patent Number: 4,543,139
[45] Date of Patent: Sep. 24, 1985

[54] RELEASABLE CLOSURE FOR BAGS AND CONTAINERS

[75] Inventors: Melvin S. Freedman, Beachwood; Paul H. Hartman, Chardon, both of Ohio

[73] Assignee: Avery International Corporation, Pasadena, Calif.

[21] Appl. No.: 651,443

[22] Filed: Sep. 17, 1984

[51] Int. Cl.[4] ............................................. B32B 31/00
[52] U.S. Cl. .................................... 156/152; 156/247; 156/268; 156/344; 383/86; 428/352; 428/354
[58] Field of Search ................ 156/230, 238, 247–249, 156/152, 344, 542, 289, 268, 256; 428/212, 343, 352, 354, 40–42; 383/86

[56] References Cited

U.S. PATENT DOCUMENTS

| 4,199,645 | 4/1980 | Schwarz | 428/40 X |
| 4,260,659 | 4/1981 | Gobran | 428/354 X |
| 4,264,388 | 4/1981 | McClintock | 156/152 |
| 4,374,883 | 2/1983 | Winslow | 428/354 X |
| 4,415,087 | 11/1983 | Clayton et al. | 383/86 X |

Primary Examiner—David Simmons
Attorney, Agent, or Firm—Pearne, Gordon, Sessions, McCoy, Granger & Tilberry

[57] ABSTRACT

Adjoining strata of pressure-sensitive adhesive are transferred to a package substrate. The two outermost adhesive strata have different adhesion to the substrate. The adhesive strata are used as a reclosable fastener and are intermixed in the course of reclosing and reopening the package, the action being such as to advantageously compensate for contamination occurring at the reseal interface while maintaining the status quo at the permanent interface.

14 Claims, 14 Drawing Figures

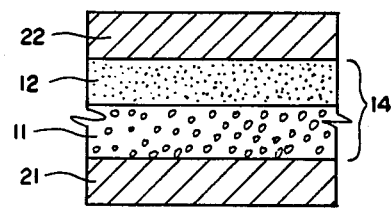
FIG. IA
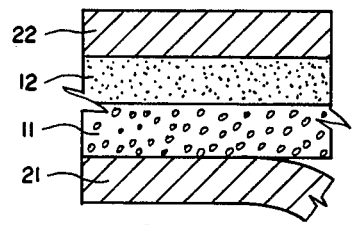
FIG. IB
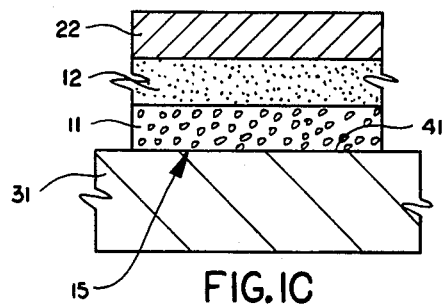
FIG. IC
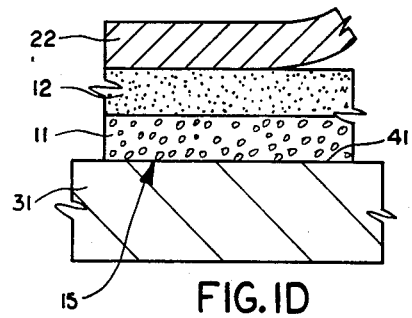
FIG. ID
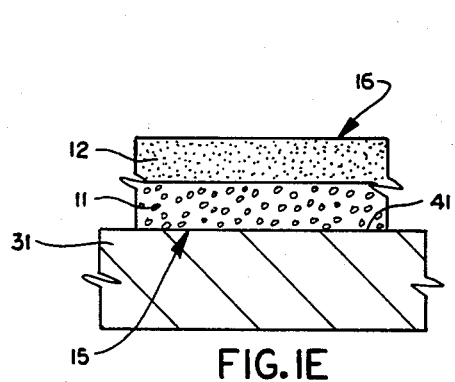
FIG. IE
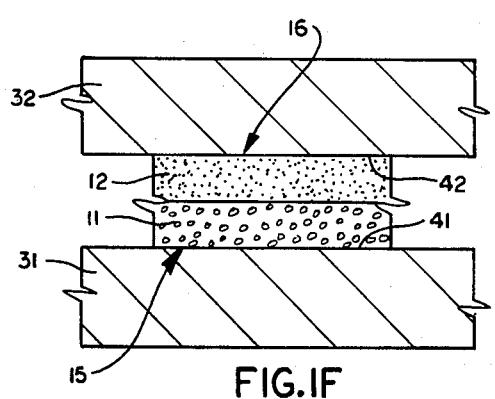
FIG. IF
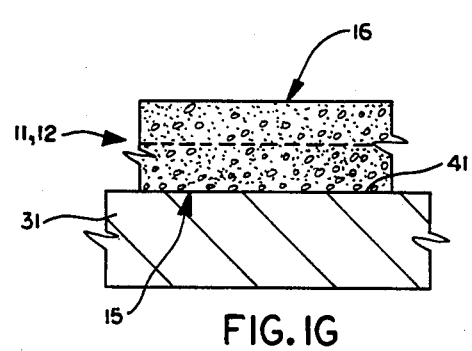
FIG. IG
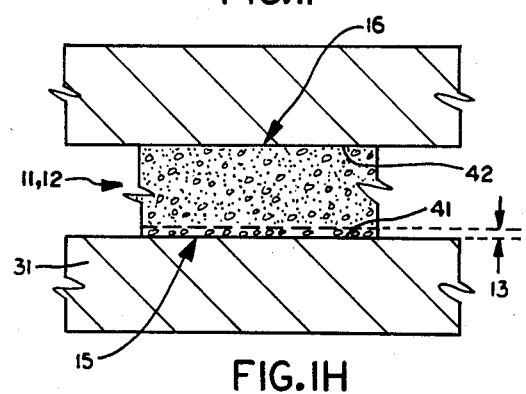
FIG. IH

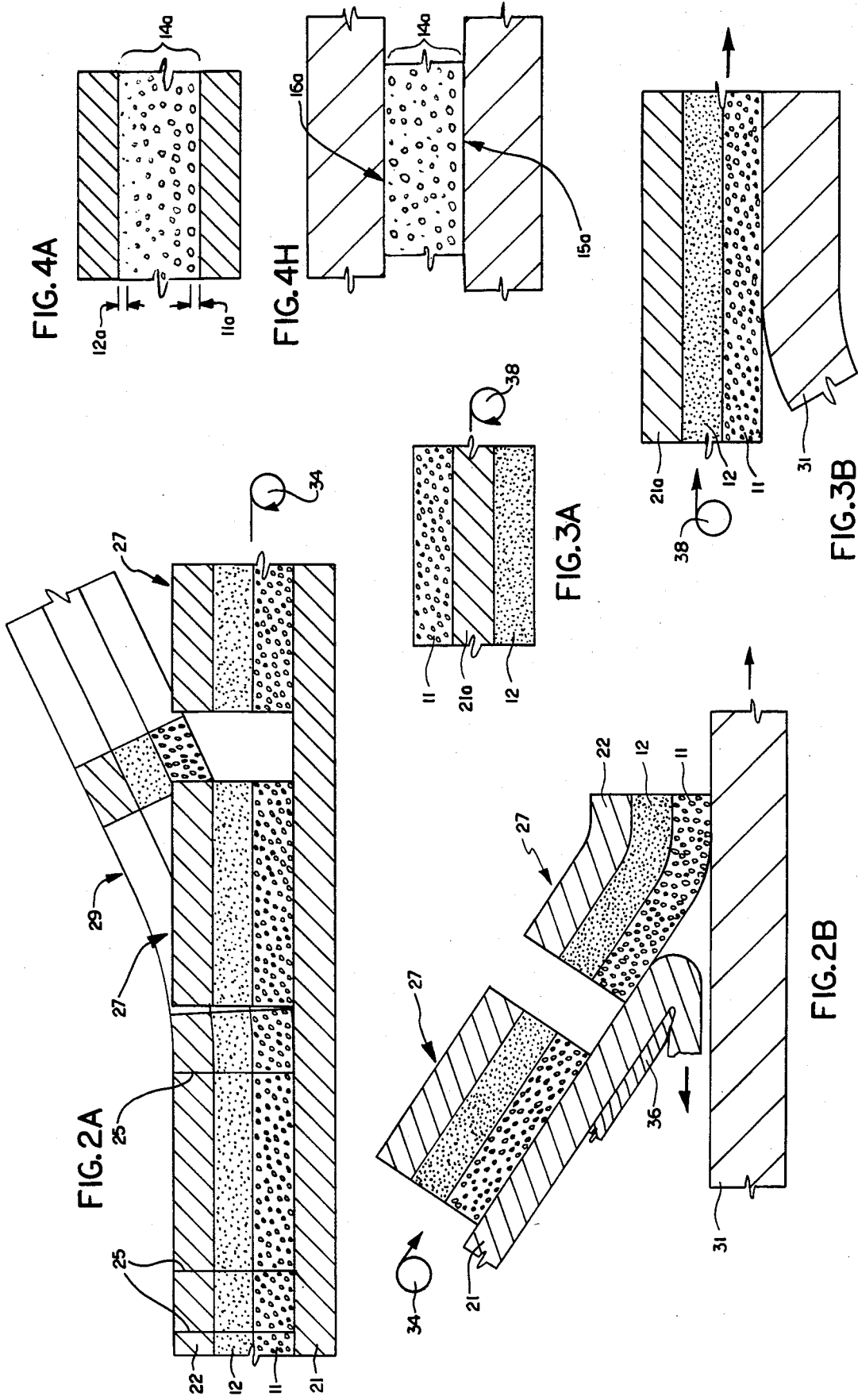

RELEASABLE CLOSURE FOR BAGS AND CONTAINERS

This invention relates to methods of end use package resealing and to resealable package closures, and particularly to a novel all-pressure-sensitive fastener system for package resealing. References to packages herein should be understood to include bags and flexible packages in general as well as rigid or semirigid containers.

BACKGROUND OF THE INVENTION

Packagers, and suppliers of adhesive products to packagers, have sought in various ways to provide, at the lowest cost, package resealing fastener means and methods which are reliable and easy for the consumer to use, which are contamination-tolerant and continue to provide effective resealing after continued reopenings, which do not require specialized label or tape application equipment, which can tolerate variations in the packaging material or substrate to which they are applied, which will operate satisfactorily over a reasonable spectrum of such materials with no need for customizing to each application, which do not require special or premium cost package substrate materials, and whose adhesive values are relatively insensitive to variations in time of seal and temperature of seal when the fastener means is originally applied, so that desired adhesion values are reliably and easily achieved and maintained.

In particular, the resealing fastener should have good differential adhesion. That is, with reference to the substrate material of a package on which the resealing fastener is provided, and on a uniform and reliable basis, the adhesion should be definitively higher at the permanent joint or interface between the fastener and the substrate material of the package than at the reseal joint or interface between the fastener and the same substrate material. There should also be high resistance to "pick," i.e., to partial transfer of the fastener adhesive to the substrate at the releasable interface, and such resistance should persist even after repeated closings and openings. These two characteristics, good differential adhesion and resistance to pick, have been achieved in prior art resealing systems only by sacrificing or compromising some of the other general objectives mentioned above.

Thus, the prior art has used thermally activated adhesives on thermoplastic films to effectively achieve very high adhesion or bonding at the permanent joint between fastener and substrate combined with a pressure-sensitive adhesive at the reseal side, but such systems require the costly use of special label application equipment. Minor variations of time of seal and temperature of seal when the fastener is originally applied greatly affect adhesion values. The protective liner which initially protects the reseal face must be more temperature-resistant and involves higher material costs. Adhesive ooze out of the sides of the fastener is also a practical problem.

The prior art has also used a carrier film or sheet to separate and prevent mixing of two pressure-sensitive adhesives of unlike adhesion. A "permanent" or high adhesion pressure-sensitive layer of adhesive interfaces with the substrate at the permanent joint, and a "removable" or relatively low adhesion layer of adhesive interfaces with the substrate at the reseal joint. One disadvantage is the cost of the carrier. Other cost disadvantages are the increased manufacturing costs associated with equipment to handle the carrier web and associated with increased production time where the construction is made as a two-pass operation. A major disadvantage is the need to customize to particular substrates. A progression of relative adhesions must be selected such that the adhesion at the permanent joint is highest, the adhesion at the reseal joint is lowest, and the differential between the adhesion of the "removable" adhesive to the carrier web and its adhesion to the substrate at the reseal joint is sufficiently high to avoid pick. These constraints not only often require customizing, but also tend to limit performance, since it may be necessary to compromise adhesion at the reseal joint in order to provide a reasonable differential from the adhesion at the interface between the "removable" adhesive and the carrier web.

Another expedient known in the prior art is simply to use a "removable" adhesive for reclosing. This gives no differential adhesion and "pick" is very high, so that transfer from one location on the substrate material to any other will readily occur.

SUMMARY OF THE INVENTION

The present invention provides a resealable fastening system with good differential adhesion and pick resistance characteristics, without sacrificing or compromising any of the general objectives mentioned above. The invention contemplates the use of adjoining pressure-sensitive adhesive strata, the outermost of which are of different adherence to the substrate material. According to the invention, the adhesive strata are partially intermixed in the course of reclosing and reopening the packages, the action being such as to advantageously compensate for contamination occurring at a reseal interface while maintaining the status quo at a permanent interface so that the permanent joint remains at full strength.

BRIEF DESCRIPTION OF THE DRAWINGS

FIGS. 1A to 1H are diagrammatic, fragmentary cross sections of laminates illustrating a presently preferred form of the adhesive fastener stock of the invention and the use thereof according to the method of the invention. Thicknesses in these and other drawings are greatly exaggerated and are not necessarily in proportion.

FIGS. 2A and 2B are diagrammatic, fragmentary cross sections illustrating how one conventional manipulation sequence may be readily utilized in the practice of the invention.

FIGS. 3A and 3B are diagrammatic, fragmentary cross sections illustrating use of another manipulative sequence in the practice of the invention.

FIGS. 4A and 4H correlate to FIGS. 1A and 1H and illustrate another form of adhesive stratification according to the invention.

DETAILED DESCRIPTION OF THE DRAWINGS

In accordance with a presently preferred form of the invention, and with reference to FIGS. 1A–H, a first pressure-sensitive adhesive 11 is provided which is of a "permanent" type which has relatively high adhesion to substrate materials employed to form packages with which the invention is to be used. The packages may comprise rigid or flexible containers or bags or the like. The first adhesive is supported on a first release liner 21.

A second pressure-sensitive adhesive 12 is positioned next to the first adhesive and is protected by a second release liner 22. The two adhesives together comprise an adhesive body 14. This laminate is shown in FIG. 1A. The second adhesive 12 has relatively low adhesion to the substrate materials employed to form the packages with which the invention is used. The adhesives may be combined by coating each on its associated release liner 21 or 22 and then laminating the two coated release liners together with their adhesive-coated sides joined, or the elements 11, 12, 22 may simply be laid down or laminated in the desired sequence over liner 21 where it is feasible and economical to directly apply one pressure-sensitive adhesive layer over another. This combining step will typically be performed by a manufacturer of adhesive laminates, as distinguished from a manufacturer or other packager of packaged products for consumers or other end-users.

The two adjacent adhesives 11 and 12 which have been positioned next to each other are then transferred to a first portion 31 of a substrate of which a package (not shown in its entirety) is formed. The adhesives are transferred, with the first adhesive permanently contacting the substrate portion 31, as shown in FIGS. 1C–H. This may be done by first removing the release liner 21 to expose the first adhesive, as shown in FIG. 1B, and then applying the subassembly, consisting of elements 11, 12, 22, to substrate 31 in any conventional manner. This application step will typically be performed by a manufacturer or other packager as part of an automated packaging operation, with the adhesive application either preceding or following the completion of the forming of the package itself. Adhesive application will often precede filling of the packages, but may follow filling of the packages in some instances. This application step establishes a permanent fastener joint at the interface 41 between permanently adhered surface 15 of the first adhesive 11 and the first substrate portion 31, as seen first in FIG. 1C.

The package itself may be initially closed by a heat seal or other means (not shown), so that the second release liner 22 remains in place while the packaged product is distributed in commerce to the consumer or other end-user. This second release liner may be imprinted on its face, say by the packager, to thereby provide a removable coupon, proof of purchase seal, or other removable decoration or indicia. Meanwhile, this liner 22 furnishes a protective cover for the second adhesive 12. Removal of liner 22, as indicated in FIG. 1D, will typically be done by the end-user, e.g., when purchasing the package, when first using the contents, or when first desiring to reclose the package. It is possible in some applications that the adhesives 11,12 may be used to establish an initial package closure on the manufacturer's packaging line, in which case the liner 22 will be removed at that time. In any event, removal of liner 12 leaves the second adhesive 12 exposed at its reseal face 16, as seen in FIG. 1E, for reception of a second substrate portion 32 of the package, as seen in FIG. 1F. Second substrate portion 32 may be part of a lid, flap, or other similar part of the package, while substrate 31 may be part of the main body of the package, or these roles may be reversed. Or, substrate 32 may simply represent a different sidewall portion of a flexible bag than substrate 31, the outsides of the two sidewall portions constacting when the bag is partially rolled up to close it. When the second adhesive 12 and the second substrate portion 32 are brought into contact, a reseal joint is established at the interface 42 between the substrate and reseal surface 16 of adhesive 12.

Subsequent reopening of the package is accomplished by the end-user by pulling apart the substrate portions 31 and 32, as by unrolling a partially rolled-up bag, pulling up a lid, lifting a flap, or the like. Subsequent reclosing is also accomplished by the end-user by reversing the process. As indicated in FIG. 1G, upon reopening the parts separate at the interface 42 due to the difference in adhesive-to-substrate adhesions between adhesives 11 and 12. As indicated in FIG. 1H, upon reclosing the reseal surface 16 is again brought into contact with a second substrate portion 32, which may represent the same "landing zone" as the original second substrate portion 32, or which may comprise a wholly or partially new landing zone displaced to greater or lesser degree from the original landing zone, as when a bag is reclosed by being partially rolled up more tightly or less tightly than when previously reclosed.

The end-user's action in reopening and reclosing the package gradually and progressively mixes the adhesives 11 and 12, as indicated diagrammatically in FIGS. 1G and 1H, by inducing relative and intermixing flow between the two adhesives during the repeated cycles of opening and closing. This progressively induced intermixing flow drives some of the first adhesive 11 toward the reseal surface 16 to compensate for the adverse effect of contamination on reseal adhesion at the reseal surface 16. Contamination is due to the presence on the substrate of oils, small food particles, and the like, and this condition typically results, for example, from the user's handling of the package and its contents. The progressively induced intermixing flow between adhesives 11 and 12 also combines the adhesives to a deepness of mixing that is relatively great as compared to the thickness of each individual adhesive layer, thereby increasing the adsorption of the contaminants.

The mechanics of the mixing action between adhesives 11 and 12 is not clearly understood, but the action is thought to occur through the separation of the adhesive(s) from substrate portion 32 by formation of filaments which, on separation, withdraw into the adhesive mass. This theory, however, is conjectural and should not be regarded as characterizing or limiting the invention.

Significantly, the relative and intermixing flow between adhesives 11 and 12 stops short of the boundary layer at the permanently adhered surface 15 of adhesive 11. Such boundary layer is indicated diagrammatically, with further exaggerated thickness, as layer 18 in FIG. 1H. Conditions at the permanent fastener joint or interface 41 remain static, and flow between adhesives 11 and 12 is therefore inhibited in boundary layer 18. Accordingly, original adhesive strength is maintained at the permanent fastener joint 41.

For polymeric substrates and polymer-coated paper substrates, and with reference to 90-degree peel adhesion of the first and second adhesives to the substrate (PSTC Test 1a), expressed in pounds-per-inch of width, the adhesion of the first adhesive 11 to the substrate should be at least 1.5. The adhesion value for the second adhesive 12 should be between 0.5 and 2.0. However, within these ranges of absolute values, the adhesion of the first adhesive should be at least 1.2 times that of the second, with a preferred ratio range of at least 1.5 or more. The 90-degree peel adhesion of the second adhesive to the substrate on the sixth reseal should be at least 0.4 or 40% of the adhesion at initial seal, performing the six seals at 15-minute intervals. The preferred value is at least 0.6 or 60% of initial seal for consumer appeal. After allowing at least one day for adhesion to build, the seventh seal should have an adhesion value of at least 0.6 or 60% of initial seal, and preferably 0.85 or 85%. The adhesion of the seventh seal should not exceed 1.5 or 150% of initial seal, and preferably should be less than 1.2 or 120% for consistent performance and prevention of welding.

Where a specific intended substrate is not known and cannot be sampled in advance, acceptable performance will reliably result if values are chosen according to the above criteria but using a prototype substrate of the same polymeric composition. Typical substrate polymers include polypropylene, polyethylene/ethylene vinyl acetate copolymers, polyesters including polyethylene terephthalate and polybutylene terephthalate, polystyrene, polyvinyl chloride, polyethylene, and nylon.

For paper or paper-bonded polymer substrates, the adhesion of the first adhesive to the substrate should be at least 0.5, and the adhesion of the second adhesive to the substrate should be between 0.1 and 0.5. Again, the adhesion of the first adhesive should be at least 1.2 times that of the second, with a preferred ratio range of at least 1.5 or more, and the other performance criteria given above should be met. This can be accomplished by known means of adjusting adherence and coating weights on a trial and error basis.

Typical examples for the first or permanent adhesive include Rohm & Haas' "E 2013" and Air Products' "Flexbond 149." The second or removable adhesive may be BASF's "Acronol 4D," or Monsanto's "RA1141" modified by cross-linking as directed by the manufacturer. These are all acrylic adhesives (Monsanto's being solvent-based and the others emulsion-based), but the invention is not limited to any particular adhesives, and, for example, the use of rubber-based adhesives is not excluded. Another emulsion-based acrylic adhesive usable as the first or permanent adhesive may be based on copolymers of 2-ethylhexyl acrylate and butyl acrylate, and a suitable second or temporary adhesive can be provided by the use of the same ingredients together with chain transfer agents and cross-linking to reduce adhesion in a well known manner.

The coat weights of the two adhesives should be comparable, but exact equality is not required. A suitable combined caliper for both adhesives may be about 38 micrometers, corresponding to a coat weight of about 45 grams per square meter. Other combined caliper values may be used, but adhesive performance, and particularly contamination tolerance, will be unsatisfactory if caliper is reduced unduly, and material costs will be unnecessarily high if caliper is substantially increased. An overall caliper of from about 35 to 45 micrometers is presently preferred, with each adhesive layer having a caliper of between about 18 and 25, but with the calipers preferably approximately equal.

Comparison tests were made of reseal adhesions on oil-contaminated bags vs. non-contaminated bags (the bags being polypropylene bags of the indicated brands of snack food), using an adhesive fastener provided according to the invention, with results as indicated on the following chart (the results being given in pounds per inch of width and standard deviations being shown in parentheses).

| Seal No./Interval Between Seals | "Cheetos" No Oil | "Cheetos" Oil | "Doritos" No Oil | "Doritos" Oil | Mean |
|---|---|---|---|---|---|
| 1 | 1.05(.14) | .94(.16) | .93(.25) | .98(.13) | .98(.05) |
| 15 min. | | | | | |
| 2 | 0.95(.10) | .68(.15) | .65(.12) | .75(.15) | .76(.13) |
| 15 min. | | | | | |
| 3 | 0.86(.13) | .68(.09) | .72(.15) | .67(.19) | .73(.09) |
| 15 min. | | | | | |
| 4 | 0.91(.13) | .76(.18) | .60(.08) | .62(.17) | .72(.14) |
| 15 min. | | | | | |
| 5 | 0.71(.08) | .61(.07) | .58(.15) | .56(.11) | .62(.06) |
| 15 min. | | | | | |
| 6 | 0.75(.12) | .60(.08) | .53(.15) | .55(.08) | .61(.10) |
| 3 days | | | | | |
| 7 | 1.01(.21) | .87(.16) | .82(.11) | .75(.14) | .86(.11) |
| 15 min. | | | | | |
| 8 | .82(.13) | .67(.19) | .63(.16) | .65(.20) | .69(.09) |
| 15 min. | | | | | |
| 9 | .81(.25) | .61(.10) | .53(.11) | .45(.13) | .60(.15) |
| 15 min. | | | | | |
| 10 | .73(.20) | .56(.12) | .51(.10) | .57(.18) | .59(.09) |
| 15 min. | | | | | |
| 11 | .68(.15) | .55(.14) | .50(.12) | .53(.12) | .57(.08) |
| 15 min. | | | | | |
| 12 | .62(.19) | .58(.13) | .47(.15) | .49(.13) | .54(.07) |
| Overall Mean Values | 0.825(.135) | 0.675(.123) | 0.622(0.139) | 0.631(.144) | |

The tests were of 90-degree peel adhesion (PSTC Test 1a) and the results are given in pounds-per-inch of width. Full bags purchased at retail were emptied, care being taken to avoid contamination of the outside surfaces. The bag substrates were then mounted on a rigid surface, with their outer sides exposed. The "no oil" specimens were tested without further treatment. The "oil" specimens were each contaminated by rubbing between the fingers chips of the snack food formerly in the bag and then rubbing the outside of the substrate with the fingers to contaminate it with the oil, salt and food particles that had been picked up from the chips. It will be noted that good contamination tolerance is shown.

In the foregoing description, the two adhesives 11 and 12 on a newly manufactured package represent two strata of pressure-sensitive adhesives. Since there are only two strata, each is an outermost stratum of the adhesive body 14 (FIG. 1A). However, the adhesive body 14 may be replaced by an adhesive body 14a (FIG. 4A) comprising two or more strata whose adhesive characteristics are unlike at the outermost faces of the body 14a. This may be accomplished, for example, by treatment of an adhesive coating by exposure of one side to ultraviolet radiation or electron beam radiation to establish differential cross-linking of adhesive molecules across the thickness of a laid-down precursor of the body 14a, or by introduction of a chemical cross-linking agent at one surface of such laid-down precursor for the same effect. The differential cross-linking may vary progressively across the thickness of the layer 14a, as graphically suggested by the progressive variance in symbol size across such thickness in FIG. 4A, to establish an indefinite number of adjoining strata of pressure-sensitive adhesive of various degrees of cross-linking, or the cross-linking may extend to a limited extent across the thickness of layer 14a to establish one or several more or less demarked degrees of cross-linking. In any event, the effect will be that a first outermost strata 11a will have a relatively high adhesion to the substrate material, and the other or second outermost strata 12a will have a relatively low adhesion to the substrate material.

When the package is reopened and reclosed, the strata making up adhesive body 14a will be gradually and progressively mixed to drive adhesive from other strata toward the strata 12a and the reseal surface 16a thereof, and the adhesive strata making up the body 14a will be combined to a relatively deep thickness of mixing to increase the absorption of contaminants, as suggested by the symbols in FIG. 4H. The bonding layer at the permanently adhered surface 15a will not experience the intermixing flow so that initial adhesive strength will be maintained at that joint.

In the packaging industry, pressure-sensitive adhesive labels are commonly applied to packages after being converted from pressure-sensitive stock into a label format by die cutting and stripping of the resulting matrix of waste material. These procedures are widely practiced and the conversion equipment to practice them is already widely possessed and used by label manufacturers and by packagers with in-house label manufacturing capability. The label format produced by the conversion can then be used by packagers on high speed automatic labeling machines to dispense and apply individual labels to individual packages, in a manner widely practiced in the industry. These established manipulation sequences may be utilized in the practice of the invention between the stages illustrated in FIGS. 1A to 1C.

Thus, as diagrammatically indicated in FIG. 2A, the pressure-sensitive stock of FIG. 1A, having been shipped in roll form from a manufacturer of pressure-sensitive stock to a converter, and having been unrolled, may be converted on conventional pressure-sensitive stock conversion equipment. The die cuts 25 extend down to but not through the first release liner 21 and form a series of individual labels 27 which remain supported on liner 21 when a matrix 29 of waste material is stripped away. The series of liner-supported labels may be taken up on roll 34 and shipped to a packager. The roll 34 is then used to supply a labeling machine. In the labeling operation, diagrammatically indicated in FIG. 2B, the release liner 21 is intermittently pulled around a peelback edge 36 to a takeup roll (not shown), thereby sequentially releasing and dispensing the individual labels onto passing substrate portions, such as the portion 31, which are associated with individual packages, suitable pressure rolls, plates, air jets or the like (not shown) also usually being used to firmly apply the individual labels 27. Obviously, these techniques may also be applied to the pressure-sensitive stock of FIG. 4A.

Other known manipulative sequences may be used in practicing the invention. Thus, for example, as indicated in FIG. 3A, the adhesives 11 and 12 may be coated on a single liner 21a which is release-coated on each face, with easier release of the first adhesive 11 than of the second adhesive 12. This stock may be taken up on roll 38 and shipped directly to a packager with tape applying equipment, and may be slit into rolled tapes either before or after shipment. Upon unrolling of the roll 38 (which represents either a roll of stock which is slit as it unrolls or an individual roll of tape which has been previously slit), the adhesive 11 transfers from liner 21a to adhesive layer 12, as indicated in FIG. 3B. Or, the adhesive may be applied as a single body to one side of the liner 21a and then treated to accomplish differential adhesion, in a manner similar to the adhesive body 14a of FIG. 4A. Or the layers 11 and 12 may simply be coated one after the other on one side of the liner 21a. Tape applying equipment is used to apply the tape to successive packages and sever the tape into individual lengths and apply it to passing substrate portions 31, associated with individual packages. The liner 21a may serve as a protective liner which is finally removed by the end-user, in a manner similar to liner 22, or it may be removed by the packager if the pressure-sensitive adhesives are relied on for the original package closure.

Vacuum roll equipment may be used to apply the tape to the package workpiece, and a water knife may perform the severing operation in accordance with known high speed packaging techniques. Or, the adhesive layers 11 and 12 on the single liner 21a may be applied to the workpiece in any other conventional manner.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A packaging method which provides for end use resealing of a package made of a substrate material comprising the steps of positioning on a release liner adjoining strata of pressure-sensitive adhesive, a first outermost of said strata having a relatively high adhesion to said substrate material and a second outermost of said strata having a relatively low adhesion to said substrate material, transferring said adjoining strata of adhesive onto a first portion of said substrate material of said package with said first outermost stratum permanently contacting said substrate to establish a permanent fastener joint at the interface between said first portion of said substrate material and the permanently adhered surface of said first outermost stratum, closing or reclosing said package to initially establish a reseal joint at an interface between some other portion of said substrate material of said package and the reseal surface of said second outermost stratum, gradually and progressively mixing said strata by reopening and reclosing said package at the point of end use to induce relative and intermixing flow between said strata and (1) drive some of the adhesive of another stratum or strata toward said reseal surface of said second outermost stratum to compensate for the adverse effect of contamination on reseal adhesion at said surface and (2) combine the strata to a relatively deep thickness of mixing to increase the adsorption of contaminants, said relative and intermixing flow stopping short of the boundary layer at the permanently adhered surface of said first outermost stratum whereby initial adhesive strength is maintained at the permanent fastener joint.

2. The method of claim 1, in which said reseal joint is initially established by reclosing of said container at the point of end use.

3. The method of claim 1, in which said reseal joint is initially established at the point of initial closing of said container.

4. The method of claim 1, said first outermost stratum having an adhesion value of at least about 0.5 pound per lineal inch of width in respect to said substrate, said second outermost stratum having an initial adhesion value of from about 0.1 pound to about 2.0 pounds per inch of lineal width in respect of said substrate, the ratio of said adhesion value of the first adhesive to said adhesive value of the second adhesive exceeding 1.2.

5. The method of claim 1, said first outermost stratum comprising a layer of a first pressure-sensitive adhesive having a relatively high adhesion to said substrate material, said second outermost stratum comprising an adjacent layer of a second pressure-sensitive adhesive having a relatively low adhesion to said substrate material.

6. The method of claim 5, said first adhesive having an adhesion value of at least about 0.5 pound per lineal inch of width in respect to said substrate, said second adhesive having an initial adhesion value of from about 0.1 pound to about 2.0 pounds per inch of lineal width in respect to said substrate, the ratio of said adhesion value of the first adhesive to said adhesive value of the second adhesive exceeding 1.2.

7. The method of claim 6, said adhesive layers each having an initial caliper of from about 18 to 25 micrometers, with a combined caliper of from about 35 to 50.

8. The method of claim 1, said positioning step including the positioning of said adjoining strata between a first release liner on the outer side of said first outermost stratum and a second release liner on the outer side of said second outermost stratum, said method including the steps of progressively die-cutting through said second release liner and said two strata but not said first release liner to serially form separate labels carried on said first release liner and to form a matrix of waste material lying outside the die cuts and stripping the matrix of waste material from around said formed labels and away from said release liner, said transferring step of said method consisting of stripping a label, as one of said series of formed labels, from said first release liner and applying it to said package, said package being one of a series of packages being labelled, said stripping and applying being performed by conventional pressure-sensitive label application equipment.

9. The method of claim 8, said method including the step of imprinting said second release liner prior to completion of said transferring step to thereby provide a removable coupon, proof of purchase seal, set of instructions, or other removable decoration or indicia.

10. The method of claim 5, said positioning step including the positioning of said two adhesives between a first release liner on the outer side of said first adhesive and a second release liner on the outer side of said second adhesive, said method including the steps of progressively die-cutting through said second release liner and said two adhesive layers but not said first release liner to serially form separate labels carried on said first release liner and to form a matrix of waste material lying outside the die cuts and stripping the matrix of waste material from around said formed labels and away from said release liner, said transferring step of said method consisting of stripping a label, as one of said series of formed labels, from said first release liner and applying it to said package, said package being one of a series of packages being labelled, said stripping and applying being performed by conventional pressure-sensitive label application equipment.

11. The method of claim 10, said method including the step of imprinting said second release liner prior to completion of said transferring step to thereby provide a removable coupon, proof of purchase seal, set of instructions, or other removable decoration or indicia.

12. A packaging method which provides for end use resealing of a package made of a substrate material comprising the steps of positioning next to each other on a release liner adjacent layers of a first pressure-sensitive adhesive having a relatively high adhesion to said substrate material and a second pressure-sensitive adhesive having a relatively low adhesion to said substrate material, transferring said adjacent adhesive layers onto a first portion of said substrate material of said package with said first adhesive permanently contacting said substrate to establish a permanent fastener joint at the interface between said first portion of said substrate material and the permanently adhered surface of said first adhesive, closing or reclosing said package to initially establish a reseal joint at an interface between some other portion of said substrate material of said package and the reseal surface of said second adhesive, gradually and progressively mixing said adhesives by reopening and reclosing said package at the point of end use to induce relative and intermixing flow between said adhesives and (1) drive some of said first adhesive toward said reseal surface to compensate for the adverse effect of contamination on reseal adhesion at said surface and (2) combine the two adhesives to a relatively deep thickness of mixing to increase the adsorption of contaminants, said relative and intermixing flow stopping short of the boundary layer at the permanently adhered surface of said first adhesive whereby initial adhesive strength is maintained at the permanent fastener joint.

13. Adhesive fastener stock to be die-cut into resealable adhesive fasteners for packaging and to be adhered to a package substrate material of polymeric film, polymer-coated paper, paper-bonded polymer or paper, said fastener stock comprising a web construction made up of adjoining strata of pressure-sensitive adhesive, a first outermost of said strata having an adhesion value of at least about 0.5 pound per lineal inch of width in respect to said substrate, a second outermost of said strata having an initial adhesion value of from about 0.1 pound to about 2.0 pounds per inch of lineal width in respect to said substrate, the ratio of said adhesion value of the first outermost stratum to the second outermost stratum exceeding 1.2.

14. Adhesive fastener stock to be die-cut into resealable adhesive fasteners for packaging and to be adhered to a package substrate material of polymeric film, polymer-coated paper, paper-bonded polymer or paper, said fastener stock comprising a web construction made up of a layer of a first pressure-sensitive adhesive, an immediately adjacent layer of a second pressure-sensitive adhesive and at least one release liner on the outer side of one of said pair of adhesives, the caliper of each said layer being from about 18 to 25 micrometers, said first adhesive having an adhesion value of at least about 0.5 pounds per lineal inch of width in respect to said substrate, said second adhesive having an initial adhesion value of from about 0.1 pound to about 2.0 pounds per inch of lineal width in respect of said substrate, the ratio of said adhesion value of the first adhesive to said adhesive value of the second adhesive exceeding 1.2.

* * * * *